United States Patent
Pediredla et al.

(10) Patent No.: US 10,805,655 B1
(45) Date of Patent: Oct. 13, 2020

(54) SET TOP BOX SOFTWARE STACK PROVISIONING

(71) Applicant: CHARTER COMMUNICATIONS OPERATING, LLC, St. Louis, MO (US)

(72) Inventors: Santosh K. Pediredla, Englewood (CO); Robert Hulshof, Highlands Ranch, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/675,855

(22) Filed: Nov. 6, 2019

(51) Int. Cl.
*H04L 29/08* (2006.01)
*H04N 21/258* (2011.01)
*H04N 7/173* (2011.01)
*H04N 21/266* (2011.01)

(52) U.S. Cl.
CPC ... *H04N 21/25833* (2013.01); *H04N 7/17318* (2013.01); *H04N 21/25816* (2013.01); *H04N 21/25841* (2013.01); *H04N 21/25858* (2013.01); *H04N 21/26606* (2013.01)

(58) Field of Classification Search
CPC ....... H04N 21/25833; H04N 21/25841; H04N 7/17318; H04N 21/25858; H04N 21/26606; H04N 21/25816
See application file for complete search history.

(56) References Cited

U.S. PATENT DOCUMENTS

| | | | |
|---|---|---|---|
| 7,810,127 B2 | 10/2010 | Stanek et al. | |
| 7,827,573 B2 | 11/2010 | Taylor et al. | |
| 8,701,102 B2 | 4/2014 | Appiah et al. | |
| 9,043,854 B2 | 5/2015 | Poli et al. | |
| 9,602,775 B2 | 3/2017 | Barnett, Jr. | |
| 2010/0313223 A1* | 12/2010 | Straub | H04N 21/485 725/60 |
| 2019/0220289 A1* | 7/2019 | Driesen | G06F 8/36 |
| 2019/0327499 A1* | 10/2019 | Poli | H04N 21/2383 |

* cited by examiner

*Primary Examiner* — Kim T Nguyen
(74) *Attorney, Agent, or Firm* — The Marbury Law Group, PLLC

(57) ABSTRACT

Various embodiments include computing devices and methods for provisioning a set top box (STB) with a software stack. A processor of a computing device may receive a software stack download request comprising downstream channel descriptor (DCD) information, determine region information for the STB based on the DCD information, determine a software stack authorization for the STB, select a software stack for the STB based on the region information and the software stack authorization for the STB, and obtain the selected software stack to enable the STB to replace existing software with the selected software stack.

30 Claims, 11 Drawing Sheets

SET TOP BOX SOFTWARE STACK PROVISIONING

BACKGROUND

Customer premises equipment such as a set top box (STB) utilizes a software stack to access and provide services from a communications network. A different software stack may be deployed to a STB based on network environment, location, household, and other factors. Managing and tracking different software stacks for installation in a STB in a warehouse by service provider is complex and difficult. The service provider must maintain multiple staging stations and track all STBs and all software stack versions to ensure that STBs are delivered to the customer premise with the correct software stack installed. Further, an installer must track all STBs with separate software stacks to ensure that the correct STB having the correct software stack is installed in the correct location.

SUMMARY

Various aspects disclosed herein include methods that may be implemented on a processor of a computing device for provisioning a STB with a software stack. Various embodiments may include receiving a software stack download request comprising downstream channel descriptor (DCD) information, determining region information for the STB based on the DCD information, determining a software stack authorization for the STB, selecting a software stack for the STB based on the region information and the software stack authorization for the STB, and obtaining the selected software stack to enable the STB to replace existing software with the selected software stack.

Some embodiments may include receiving a software stack download request comprising DCD information, determining region information for the STB based on the DCD information, determining a software stack authorization for the STB, selecting a software stack for the STB based on the region information and the software stack authorization for the STB, and obtaining the selected software stack to enable the STB to replace existing software with the selected software stack. In some embodiments, the DCD information may include a cable modem termination system (CMTS) name. In some embodiments, the DCD information may include a DOCSIS service group identifier. In some embodiments, the DCD information may include RF plant information.

In some embodiments, determining region information for the STB based on the DCD information may include determining an area code in the DCD information, sending a query to a microservices server for a RegionID based on the determined area code, and receiving from the microservices server the RegionID. In such embodiments, determining the area code in the DCD information comprises determining the area code based on a CMTS name. In some embodiments, determining region information for the STB based on the DCD information may include sending a query to a microservices server for a HubID, and receiving from the microservices server the HubID. In such embodiments, the query to the microservices server may include a CMTS name and a DOCSIS service group identifier.

Some embodiments may include determining a software stack of the STB. In such embodiments, selecting a software stack for the STB based on the region information and the software stack authorization for the STB further may include selecting the software stack for the STB based on the determined software stack. In some embodiments, obtaining the selected software stack to enable the STB to replace existing software with the selected software stack may include sending to the STB a resource locator to enable the STB to download the selected software stack and replace the existing software with the downloaded software stack.

Various aspects further include a computing device having a processor configured with processor executable instructions to perform operations of any of the methods summarized above. Various aspects further include a processing device for use in a computing device and configured to perform operations of any of the methods summarized above. Various aspects include a computing device having means for performing functions of any of the methods summarized above. Various aspects include a non-transitory processor-readable storage medium having stored thereon processor-executable instructions configured to cause a processor of a computing device to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
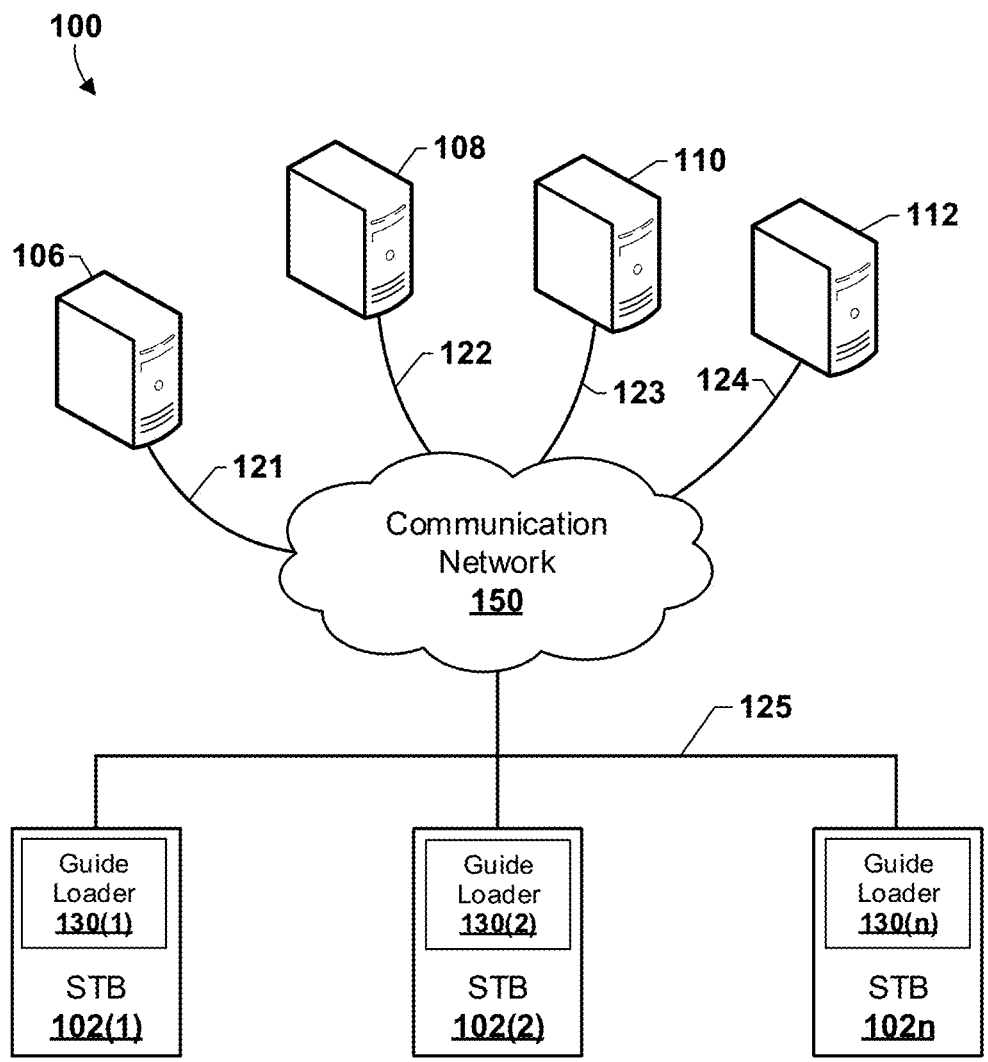
FIG. 1 is a system block diagram of a communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

The term "computing device" is used herein to refer to any one or all of network elements such as servers, routers, set top boxes, head-end devices, and other similar network elements, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cordless phones, network-connected displays (such as advertisement screens, news screens, and the like), wireless local loop (WLL) station, entertainment devices (for example, a music or video device, or a satellite radio), gaming devices, wireless gaming controllers, cameras, medical devices or equipment, biometric sensors/devices, wearable devices (such as smart watches, smart clothing, smart glasses, smart wrist bands, smart jewelry (for example, smart ring, smart bracelet)), smart meters/sensors, industrial manufacturing equipment, router devices, appliances, global positioning system devices, wireless-network enabled Internet of Things (IoT) devices including large and small machinery and appliances for home or enterprise use, wireless communication elements within autonomous and semiautonomous vehicles, a vehicular component or sensor, wireless devices affixed to or incorporated into various mobile platforms, and similar electronic devices that include a memory, wireless communication components and a programmable processor, or that is configured to communicate via a wireless or wired medium.

Customer premises equipment such as a set top box (STB) utilizes a software stack to access and provide services from a communications network. A different software stack may be deployed to a STB based on network environment, location, household, and other factors. Managing and tracking different software stacks for installation in a STB in a warehouse by service provider is complex and difficult. The service provider must maintain multiple staging stations and track all STBs and all software stack versions to ensure that STBs are delivered to the customer premise with the correct software stack installed. Further, an installer must track all STBs with separate software stacks to ensure that the correct STB having the correct software stack is installed in the correct location. Because of this complexity and because there is no physical difference among STBs that may indicate what software stack is installed on a particular STB, service providers may provide, and installers may install, a STB with the wrong software stack. A STB having the wrong software stack installed thereon may be unable to access or provide the proper services at the customer premises, and may present inappropriate or inapplicable controls and functions as well.

To address these problems, various embodiments include methods that may be implemented on a processor of a computing device to provision a STB with a correct software stack. In some embodiments, a STB may be configured with a guide loader function that is capable of running or executing in a variety of hardware and software environments. In some embodiments, the guide loader function may be configured to detect without user intervention what software stack a STB requires. In some embodiments, the guide loader function may be configured to facilitate the downloading from a service provider's communication network of the correct software stack on a STB, and installation of the correct software stack on the STB.

In various embodiments, a processor of the network element may receive a software stack download request comprising downstream channel descriptor (DCD) information, determine region information for the STB based on the DCD information, determine a software stack authorization for the STB, select a software stack for the STB based on the region information and the software stack authorization for the STB, and obtain the selected software stack to enable the STB to replace existing software with the selected software stack.

In some embodiments, the network element may receive the software stack download request from a guide loader function implemented on a STB. In some embodiments, the STB may be a newly installed or a newly-powered up STB at a customer premises. In some embodiments, the guide loader function may execute on the STB upon power up or upon receiving an instruction to initiate the guide loader function. In some embodiments, the guide loader function may determine DCD information relevant to the STB. In some embodiments, the DCD information may include a cable modem termination system (CMTS) name. In some embodiments, the DCD information may include a DOCSIS service group identifier. In some embodiments, the DCD information may include radio frequency (RF) plant information. In some embodiments the RF plant information may indicate how video and/or communication signals are formatted in a service provide head-end. In some embodiments the RF plant information may indicate a type of head-end with which the STB may be in communication.

In some embodiments, to determine region information for the STB based on the DCD information, the network element may determine an area code in the DCD information, and may map the area code in the DCD information to a RegionID. In some embodiments, determining the area code in the DCD information may include determining the area code based on a CMTS name. In some embodiments, determining region information for the STB based on the DCD information may include sending a query to a microservices server for the RegionID based on the determined area code, and receiving from the microservices server the RegionID.

In some embodiments, determining region information for the STB based on the DCD information may include sending a query to a microservices server for a HubID, and receiving from the microservices server the HubID. In such embodiments, the query to the microservices server may include a CMTS name and a DOCSIS service group identifier.

In some embodiments, the network element may determine a software stack to load into the STB. In some embodiments, the determined software stack may include a legacy software stack. For example, the network element may determine a software stack associated with the customer premises, or a customer account associated with the customer premises. In some embodiments, the network element may select a software stack for the STB based on the region information and the software stack authorization for the STB further by selecting the software stack for the STB based on the determined software stack that was installed on a previous STB located and installed at the customer premises or associated with the customer account. In some embodiments, the network element may send to the STB a resource locator to enable the STB to download the selected software stack and replace the existing software with the downloaded software stack.

Various embodiments improve the operation of STBs and communication networks by automatically enabling the identification and installation of a correct software stack in the correct location for a STB. Various embodiments improve the accuracy and efficiency of STB network communication by automatically configuring the STB to access or provide the proper services at the customer premises. Various embodiments may further improve the operation of STB is by automatically configuring the STB to present appropriate controls and functions.

Various embodiments may be implemented within a variety of communication systems 100, an example of which is illustrated in FIG. 1. With reference to FIG. 1, the communication system 100 may include one or more set top boxes (STBs) 102 (e.g., STBs102(1), 102(2), . . . , 102(n)), a cable modem termination system (CMTS) 106, a software stack server 108, one or more microservices servers 110, one or more content data network (CDN) servers 112, and a communication network 150. The cable modem termination system (CMTS) 106, the download server 108, and the one or more microservices servers 110 may communicate with the communication network 150 via a respective wired or wireless communication link 121-124. Each STB 102 may communicate with the communication network 150 via a wired or wireless communication link 125.

The STBs 102 may request and/or receive data (which may include audio, video, multimedia, and other data traffic) via the communication network 150. Each STB 102 may include customer premises equipment, which may be implemented as a set top box, a router, a modem, or another suitable device configured to provide functions of an STB. In some embodiments, the communication network 150 may include one or more optical/fiber nodes through which one or more of the STBs 102 may communicate with the CMTS 106, the software stack server 108, the microservices server(s) 110, and the CDN servers. Each STB may be configured with a guide loader function 130. The guide loader function 130 may be configured to provide information about the STB 102 as part of a process for provisioning the STB 102 with a software stack.

The CMTS 106 may be configured to provide high speed data services, such as cable Internet, Voice over Internet Protocol services, to the service subscribers. In some embodiments, one or more television channels may carry upstream and downstream signals to and from the CMTS from a STB 102. In some embodiments, the CMTS 106 may reformat signals received from a STB 102 for transmission via a network or internetwork (e.g., Internet Protocol (IP) packets).

The software stack server 108 may be configured to determine a software stack from a plurality of software stacks for a STB 102, as further described below.

The microservices server 110 may be configured to provide information about each STB 102, including authorization information for information and/or services that may be provided to each STB 102.

The content data network (CDN) server(s) 112 may store a plurality of software stacks, and may provide a determined software stack to a STB 102 upon request.

The communication network 150 may support wired and/or wireless communication among the various network elements 106-112 and the STBs 102. The communication network 150 may include one or more network elements, such as servers and other similar devices (not illustrated). The communication system 100 may include additional network elements to facilitate communication among the various network elements 106-112 and the STBs 102.

The communication links 121-125 may include wired and/or wireless communication links. Wired communication links may include coaxial cable, optical fiber, and other similar communication links, including combinations thereof (for example, in an HFC network). Wireless communication links may include a plurality of carrier signals, frequencies, or frequency bands, each of which may include a plurality of logical channels. Wired communication protocols may use a variety of wired networks (e.g., Ethernet, TV cable, telephony, fiber optic and other forms of physical network connections) that may use one or more wired communication protocols, such as Data Over Cable Service Interface Specification (DOCSIS), Ethernet, Point-To-Point protocol, High-Level Data Link Control (HDLC), Advanced Data Communication Control Protocol (ADCCP), and Transmission Control Protocol/Internet Protocol (TCP/IP), or another suitable wired communication protocol.

The wireless and/or wired communication links 121-125 may include a plurality of carrier signals, frequencies, or frequency bands, each of which may include a plurality of logical channels. Each of the wireless communication links may utilize one or more radio access technologies (RATs). Examples of RATs that may be used in one or more of the various wireless communication links 121-125 include an Institute of Electrical and Electronics Engineers (IEEE) 802.15.4 protocol (such as Thread, ZigBee, and Z-Wave), any of the Institute of Electrical and Electronics Engineers (IEEE) 16.11 standards, or any of the IEEE 802.11 standards, the Bluetooth standard, Bluetooth Low Energy (BLE), 6LoWPAN, LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, MuLTEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), and Weightless. Further examples of RATs that may be used in one or more of the various wireless communication links within the communication system 100 include 3GPP Long Term Evolution (LTE), 3G, 4G, 5G, Global System for Mobility (GSM), GSM/General Packet Radio Service (GPRS), Enhanced Data GSM Environment (EDGE), Code Division Multiple Access (CDMA), frequency division multiple access (FDMA), time division multiple access (TDMA), Wideband Code Division Multiple Access (W-CDMA), Worldwide Interoperability for Microwave Access (WiMAX), Time Division Multiple Access (TDMA), and other mobile telephony communication technologies cellular RATs, Terrestrial Trunked Radio (TETRA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, and other mobile telephony communication technologies cellular RATs or other signals that are used to communicate within a wireless, cellular or Internet of Things (IoT) network or further implementations thereof.

Figure 2:
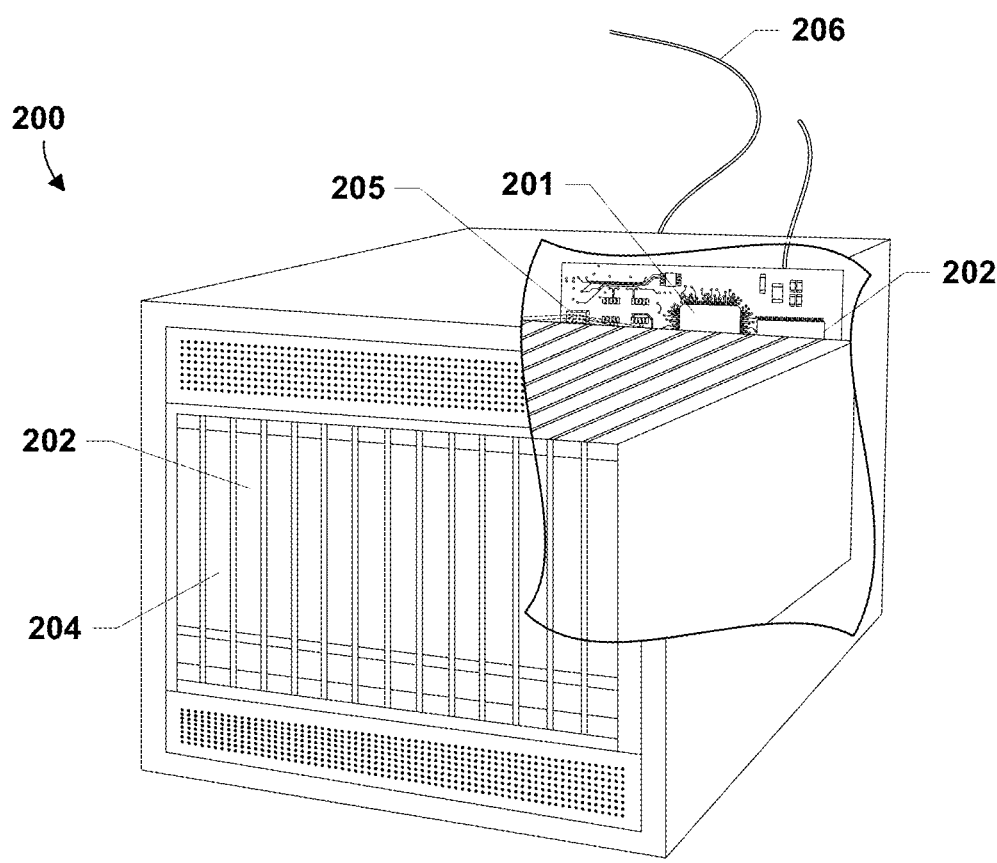
FIG. 2 is a component block diagram illustrating components of a network element suitable for implementing various embodiments.

Various embodiments may employ a computing device as a server, router, or another suitable element of a communication network. Such network elements may typically include at least the components illustrated in FIG. 2, which illustrates an example network element 200. With reference to FIGS. 1 and 2, the network element 200 (e.g., the network elements 104-112) may include a processor 201 coupled to volatile memory 202 and a large capacity nonvolatile memory, such as a disk drive 203. The network element 200 may also include a peripheral memory access device such as a floppy disc drive, compact disc (CD) or digital video disc (DVD) drive 206 coupled to the processor 201. The network element 200 may also include network access ports 204 (or interfaces) coupled to the processor 201 for establishing data connections with a network, such as the Internet and/or a local area network coupled to other system computers and servers. Similarly, the network element 200 may include additional access ports, such as USB, Firewire, Thunderbolt, and the like for coupling to peripherals, external memory, or other devices.

Figure 3:
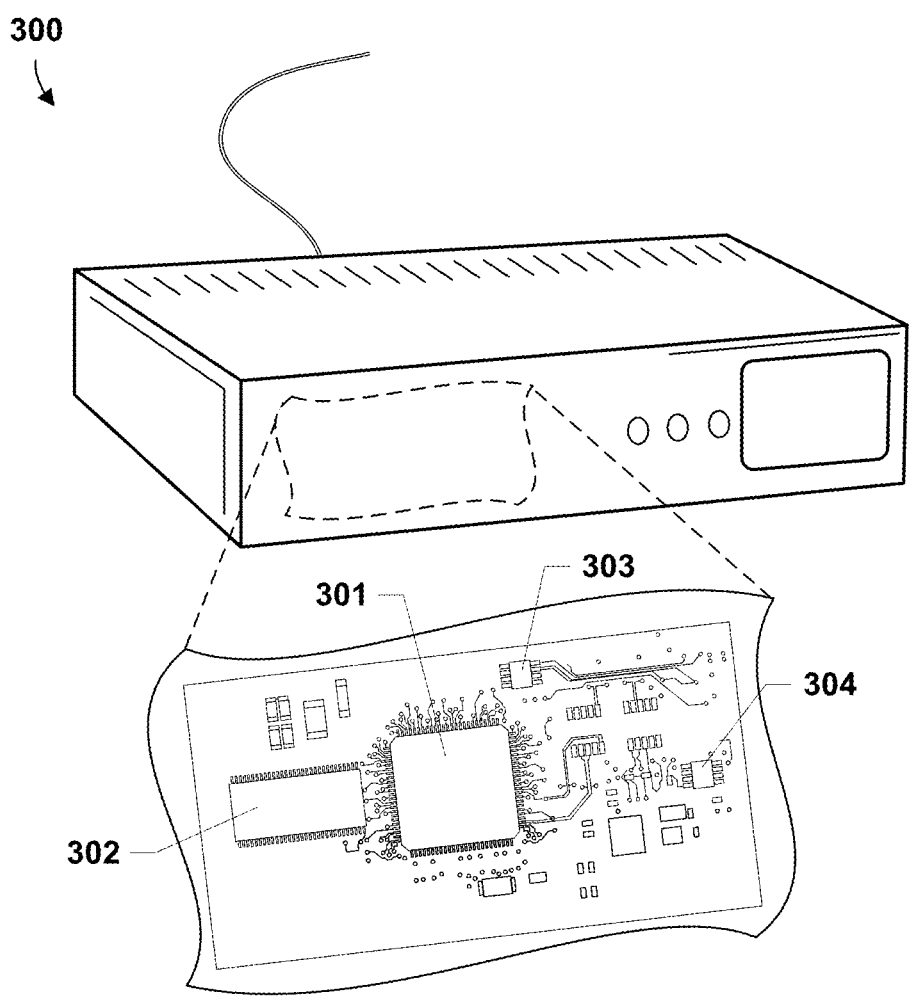
FIG. 3 is a component block diagram illustrating components of a set top box suitable for implementing various embodiments.

Various embodiments may employ a set top box. A set top box (e.g., the STBs 102) may typically include at least the components illustrated in FIG. 3, which illustrates an example set top box 300 suitable for use with various embodiments. With reference to FIGS. 1-3, the set top box 300 may include a processor 301 coupled to a memory device 302. The set top box 300 may also include network access ports 303 (or interfaces) coupled to the processor 301 for establishing data connections with a communications network (e.g., the communications network 150) and/or with a network element via the communications network (e.g., the network elements 104-112). The set top box 300 may include additional access ports, such as USB, Firewire, Thunderbolt, and the like for coupling to peripherals, external memory, or other devices. The set top box 300 may also include one or more user interface drivers 304 to support a variety of interactions with user interface devices and controls. Examples of such user interface devices and controls may include buttons, knobs, switches, touchscreens, etc. provided on the set top box 300, as well as RF, infrared, and other interfaces that enable communication with a remote control device.

Figure 4:
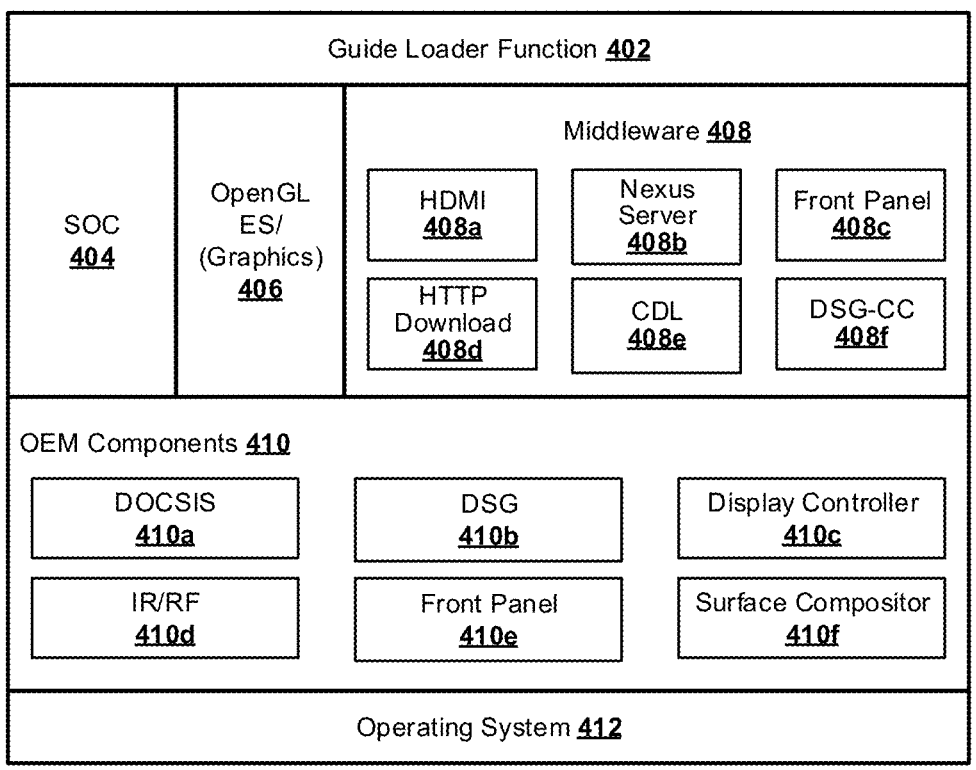
FIG. 4 is a block diagram illustrating a guide loader software stack suitable for use with various embodiments.

In various embodiments, a STB (e.g., the STBs 102, the STB 300) may be configured with a software stack configured to provide a variety of functions and services. FIG. 4 is a block diagram illustrating an example of a guide loader software stack 400 suitable for use with various embodiments. With reference to FIGS. 1-4, the software stack 400 may include at least a guide loader function 402, system on chip (SOC) drivers 404, graphics drivers 406, one or more middleware components 408, one or more original equipment manufacturer (OEM) components 410, and an operating system 412. The software stack may be stored in may be stored on a non-transitory computer-readable or processor-readable storage medium (e.g., the memory 302).

The SOC drivers 404 and the graphics drivers 406 may include processor-executable instructions to control and/or manage the scheduling of computing tasks, executing applications, and controlling software modules and/or hardware devices of the STB, such as SOC and graphics devices. The operating system 412 (e.g., Linux, etc.) may provide processor-executable instructions to control and/or manage the scheduling of computing tasks, executing applications, and controlling software modules and/or hardware devices of the STB.

The middleware components 408 may include software and/or hardware components to manage and/or provide various functionality of the STB. For example, the middleware 408 may include an HDMI component 408a, a nexus server component 408b, a front panel component 408c, a hypertext transfer protocol (HTTP) download manager component 408d, common download (CDL) manager component 408e, and a DOCSIS Set-top Gateway (DSG) interface manager component 408f (e.g., DSG-cable card (CC) manager).

The OEM components 410 may include software and/or hardware components to manage and/or provide various functionality of the STB that may be provided by individual OEMs. For example, the OEM components 410 may include a DOCSIS component 410a (e.g., to manage DOCSIS compliant communications), a DSG component 410b (e.g., to manage a DSG interface), a display controller 410c (e.g., to control a display device to present information), an infrared/RF communication manager 410d (e.g., to enable communication with an IR or RF remote control device), a front panel manager (e.g., to receive inputs from a user interface), and a surface compositor 410f (e.g., to combine a variety of information for presentation).

The guide loader function 402 may be configured to run or execute in a variety of hardware and software environments. In some embodiments, the guide loader function may be configured to detect without user intervention what software stack is appropriate for a STB. In some embodiments, the guide loader function may be configured to facilitate the downloading from a service provider's communication network of the appropriate software stack onto a STB, and installation of the appropriate software stack on the STB. In some embodiments, the guide loader function 402 may include a network interface element and a download element, to enable the guide loader function 402 to download and install a software stack on the STB.

Figure 5:
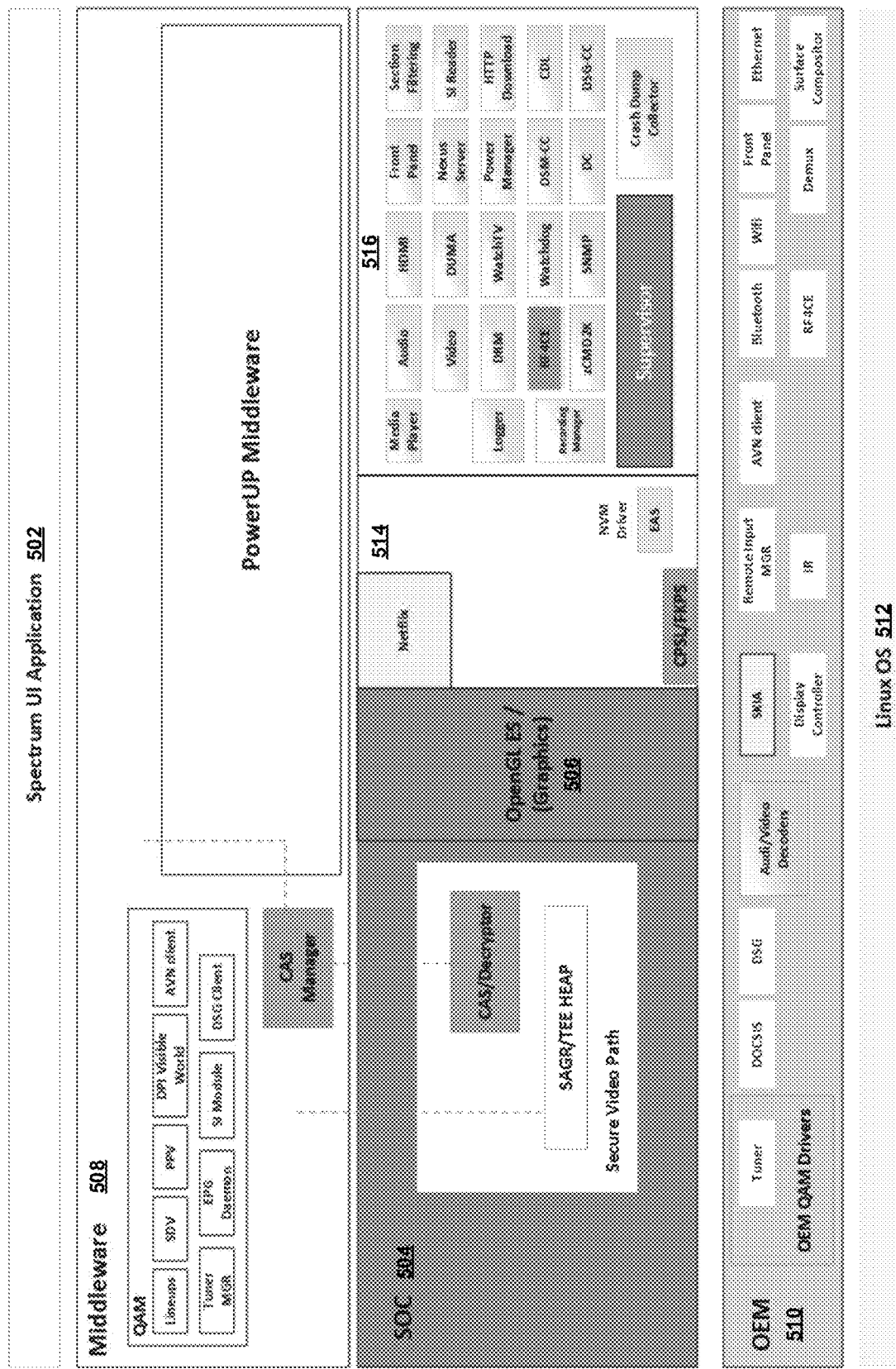
FIGS. 5 and 6 are block diagrams illustrating example software stacks 500 and 600 suitable for use with various embodiments.
Figure 6:
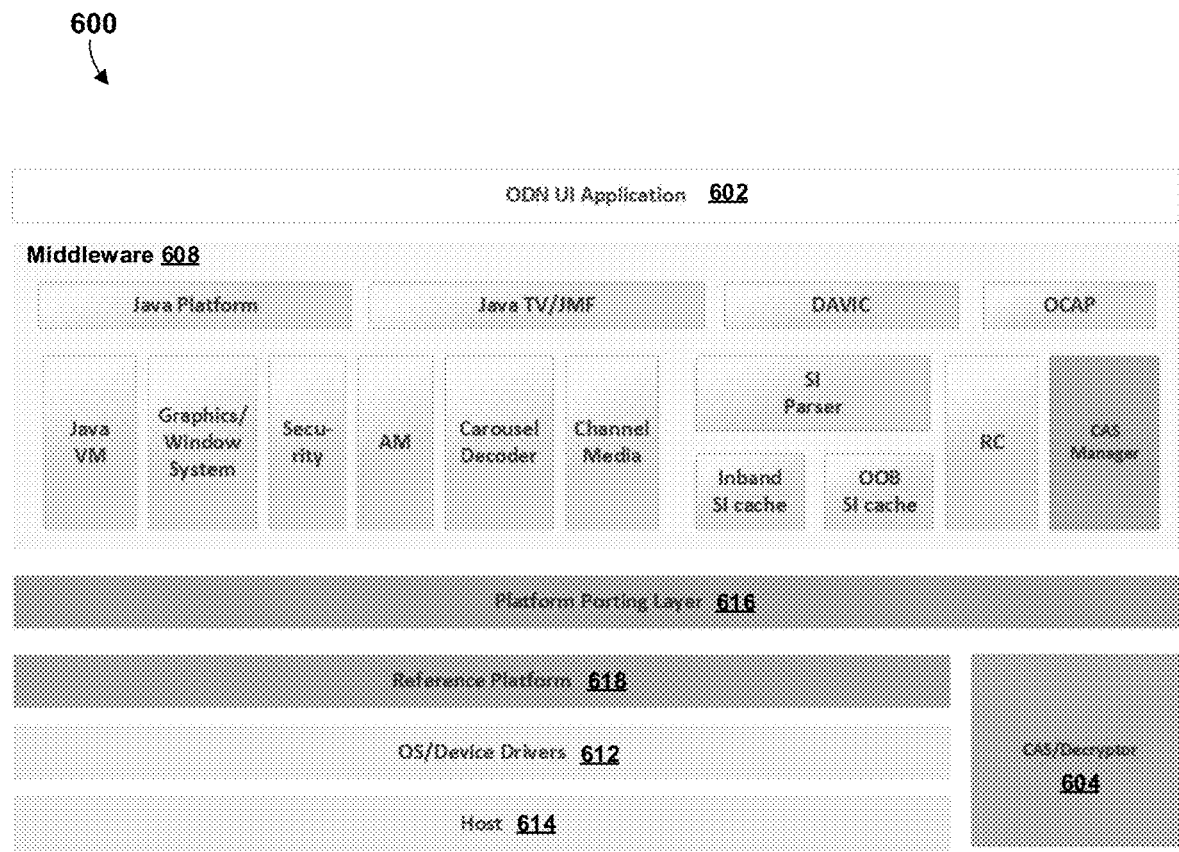

FIGS. 5 and 6 are block diagrams illustrating example software stacks 500 and 600 suitable for use with various embodiments. The software stacks 500 and 600 are non-limiting examples of implementations of software stacks that may be determined for an STB and downloaded to the STB, to enable replacement of the entire software stack of the STB with the provided software stack. The software stacks 500 and 600 may include at least the illustrated components, which serves to illustrate differences between software stacks that may be determined for a STB and provided to the STB, With reference to FIGS. 1-5, the software stack 500 may include at least a UI application 502, one or more middleware components 508, one or more OEM components 510, and an operating system 512 that may run or execute on a system on chip (SOC) 504 and/or a graphics card 506.

The SOC drivers 504 and the graphics drivers 506 may include processor-executable instructions to control and/or manage the scheduling of computing tasks, executing applications, and controlling software modules and/or hardware devices of the STB, such as SOC and graphics devices. The operating system 512 (e.g., Linux, etc.) may provide processor-executable instructions to control and/or manage the scheduling of computing tasks, executing applications, and controlling software modules and/or hardware devices of the STB. The UI application 502 may control aspects of a user interface that may be presented by the STB to access content and control various aspects of STB functions.

The middleware 508 may include a variety of modules and components to provide features and functionality to a STB, including decoding demodulation components (e.g., quadrature amplitude modulation (QAM) components, a content access protection module (e.g., a Conditional Access System (CAS) Manager), middleware 514 to enable access to one or more content services (e.g., Netflix), and device drivers and components 516 to enable the control and/or operation of various STB functions, (e.g., media player, audio decoding and playback, video decoding and playback, signal decoding from various inputs such as HDMI and other communication links, and the like), and other components.

The OEM components 510 may include software and/or hardware components to manage and/or provide various functionality of the STB that may be provided by individual OEMs. For example, the OEM components 510 may include, for example, OEM QAM drivers, a DOCSIS component, a DSG component, audio and video decoders, a display controller, an infrared communication manager, wireless communication managers (e.g., for protocols such as Bluetooth, Wi-Fi, RF4CE/Zigbee, etc.), a front panel manager (e.g., to receive inputs from a user interface), a surface compositor, and other components.

With reference to FIGS. 1-6, the software stack 600 may include at least a UI application 602, one or more middleware components 608, a platform porting layer 616, a reference platform 618, a Content Access System (CAS)/content decryptor system 604, an operating system 612 that may include a variety of device drivers, and a host 614. Each of the components 602-614 may run or execute on an SOC and/or a graphics card (not illustrated), which may include one or more processors configured to execute processor-executable software or processor-executable instructions. The processor-executable instructions may reside on a non-transitory computer-readable or processor-readable storage medium (e.g., the memory 302).

The operating system (e.g., Linux, etc.) and device drivers 612 may include processor-executable instructions to control and/or manage the scheduling of computing tasks, executing applications, and controlling software modules and/or hardware devices of the STB, such as SOC and graphics devices. The UI application 602 may control aspects of a user interface that may be presented by the STB to access content and control various aspects of STB functions.

The middleware 608 may include a variety of modules and components to provide features and functionality to a STB, including a Java platform, Java TV or Java Media Framework (JMF), a Digital Audio Video Council (DAVIC) standard module, an OpenCable Application Platform (OCAP) module, and/or a variety of other modules and components.

The platform porting layer 616 and the reference platform 618 may include an abstraction layer, set of APIs, and/or the like to provide an abstraction of STB functionality. The Content Access System (CAS)/content decryptor system 604 may provide a content access protection function. The host 614 may include elements configured to communicate with and/or operate devices that may be specific to various STB models.

Figure 7:
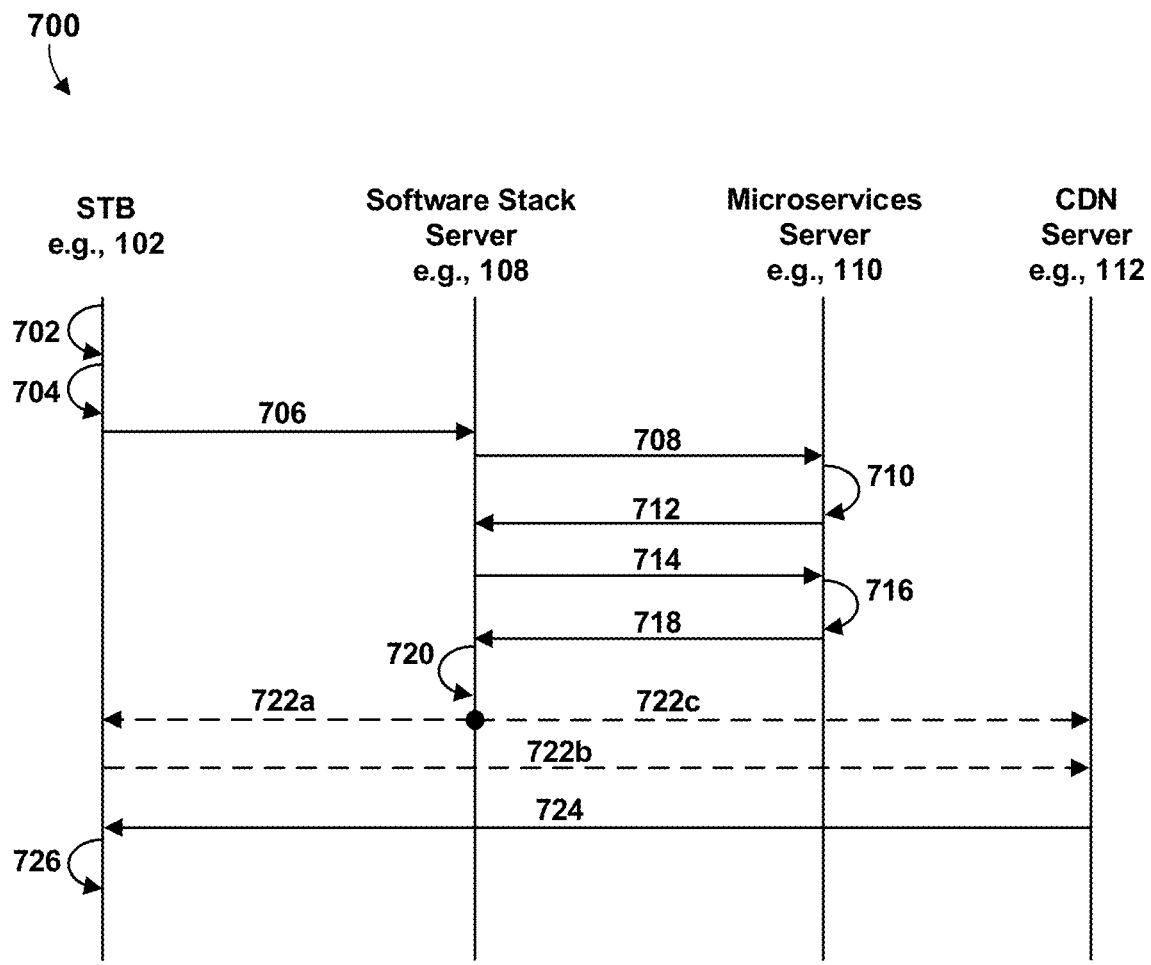
FIG. 7 is a message flow diagram illustrating a method of provisioning a STB with a software stack according to various embodiments.

FIG. 7 is a message flow diagram illustrating a method 700 of provisioning a STB with a software stack according to various embodiments. With reference to FIGS. 1-7, the operations of the method 700 may, for example, be implemented in hardware components and/or software components of a computing device (e.g., network elements 104-108) the operation of which may be controlled by one or more processors (e.g., the processor 301 and/or the like).

The processor of a STB (e.g., the processor 301 of a STB 102, 300) may initialize a guide loader function 702. In some embodiments, the STB may initialize the guide loader function when the STB is first powered on at a customer premises. In some embodiments, the STB may initialize the guide loader function in response to an input at a user interface of the STB to initialize the guide loader function.

The STB processor may (e.g., via the guide loader function) detect DCD information 704 from a network communication link. For example, the STB processor may detect the DCD information from a DOCSIS RF connection. In some embodiments, the DCD information may include a CMTS name. In some embodiments, the CMTS name may include a unique identifier, a network address, or another suitable CMTS name. In some embodiments, the DCD information may include a DOCSIS service group identifier. In some embodiments, the DCD information may include RF plant information.

The STB processor may send a software stack download request 706 to a software stack server (e.g., 108). In some embodiments, the software stack download request may include one or more elements of DCD information. In some embodiments, the software stack download request may include an Inform request. In some embodiments, the software stack download request may include a request for information or for an identification of a correct software stack for the STB.

The software stack server 108 may send a query message 708 to a microservices server (e.g., 110) to request region information about the STB from the microservices server. In some embodiments, the query message 708 may include the CMTS name from the DCD information. In some embodiments, the query message 708 may include the DOCSIS service group identifier from the DCD information.

The microservices server 110 may perform an operation 710 to determine the requested region information about the STB. In some embodiments, the microservices server may determine a RegionID based on the CMTS name. For example, the microservices server 110 may determine a code in the CMTS that maps to a RegionID. In some embodiments, microservices server may determine a HubID based on the CMTS name and the DOCSIS service group identifier.

The microservices server 110 may send the region information to the software stack server 108 in a message 712.

The software stack server 108 may send a query message 714 to the microservices server 110 to determine the software stack authorization for the STB 102, 300. For example, the STB may be associated with a service provider record indicating one or more software stacks for which the STB is authorized. In some embodiments, different software stacks may include different levels of authorized services, may provide access to different services, and the like.

The microservices server 110 may perform an operation 716 to determine the appropriate software stack authorization for the STB 102, 300.

The microservices server 110 may send the determined appropriate software stack authorization to the software stack server 108 in a message 718.

Based on the region information and the software stack authorization for the STB 102, 300, the software stack server 108 may select a software stack for the STB 102, 300 in operation 720.

The software stack server 108 may obtain the selected software stack to enable the STB 102, 300 to replace existing software (e.g., the guide loader software stack 400) with the selected software stack (e.g., the software stack 500 or 600). In some embodiments, the software stack server 108 may send a resource locator to the STB 102, 300 in an optional message 722a to enable the STB 102, 300 to send an optional message 722b to a CDN server (e.g., 112) to obtain the selected software stack. In some embodiments, the software stack may send an optional message 722c to the CDN server 112 to request that the CDN server 112 provide the selected software stack to the STB 102, 300.

The CDN server 112 may send to the STB 102, 300 a message 724 including the selected software stack. For example, the message 724 may represent a download of the selected software stack to the STB.

In operation 726, the STB 102, 300 may install the selected software stack. In some embodiments, as part of the operation 726, the STB 300 may perform a reinitialization operation or a reboot after installing the selected software stack.

In various embodiments, the STB 102, 300 installs or replaces an entire software stack when installing the selected software stack. For example, the installation of the software stack may include the software stack 500 or the software stack 600. In various embodiments the selected software stack, when installed, may replace the guide loader software stack 400.

Figure 8:
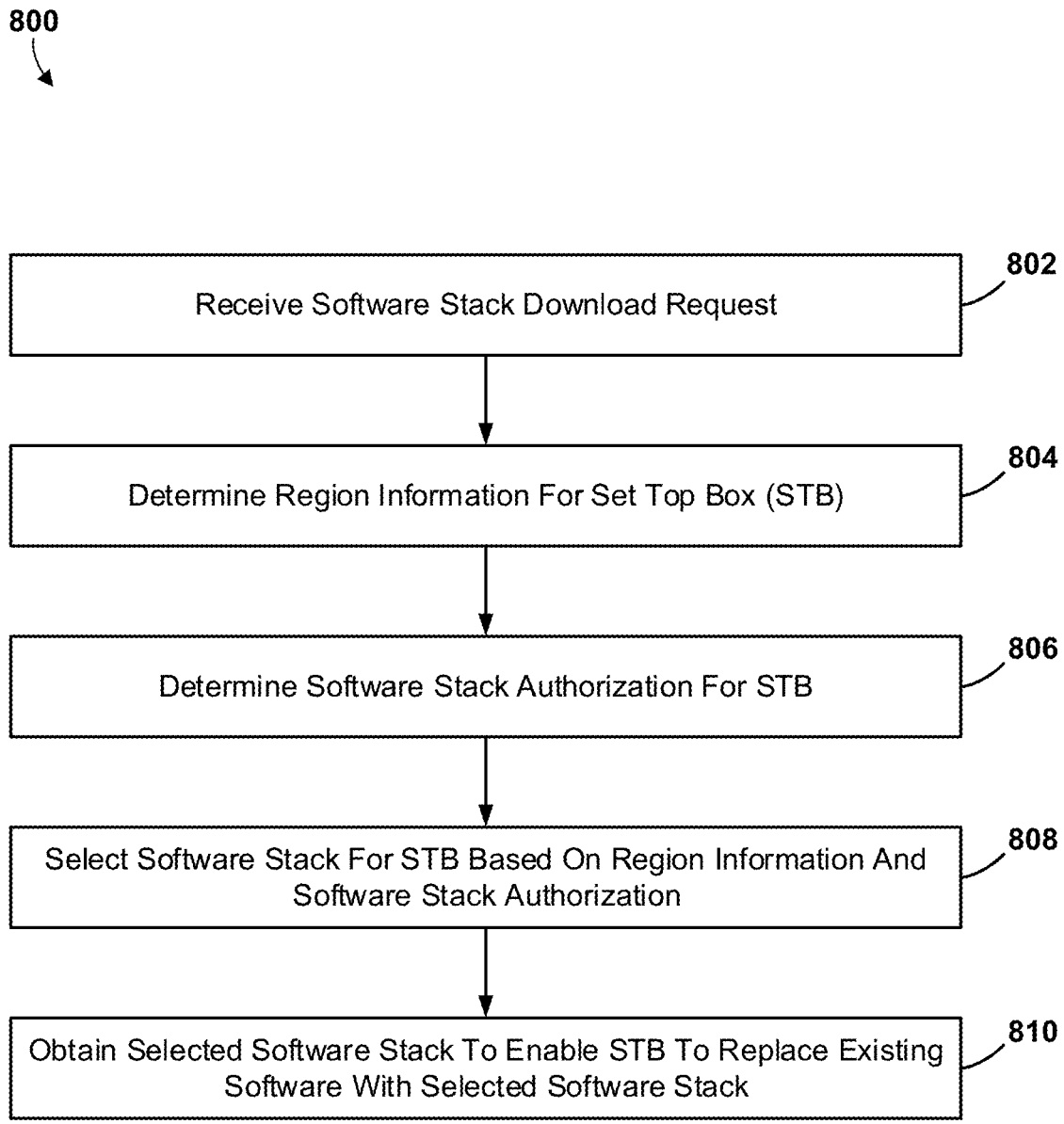
FIG. 8 is a process flow diagram illustrating a method of provisioning a STB with a software stack according to various embodiments.

FIG. 8 is a process flow diagram illustrating a method 800 of provisioning a STB with a software stack according to various embodiments. With reference to FIGS. 1-8, the operations of the method 800 may be implemented in hardware components and/or software components of a computing device (e.g., the software stack server 108) the operation of which may be controlled by one or more processors (e.g., the processor 201 and/or the like).

In block 802, the computing device processor may receive a software stack download request comprising downstream channel descriptor (DCD) information. For example, the processor may receive a software stack download request from a guide loader function of a STB (e.g., the message 706, FIG. 7).

In some embodiments, the software stack download request may include, or may be received with, various information. In some embodiments, the additional information may be received in one or more messages separate from the download request. In some embodiments, the additional information may include DCD information. In some embodiments, the DCD information may include a CMTS name. In some embodiments, the CMTS name may include a unique identifier, a network address, or another suitable CMTS name. In some embodiments, the DCD information may include a DOCSIS service group identifier. In some embodiments, the DCD information may include RF plant information.

In block 804, the processor may determine region information for the STB based on the DCD information. In some embodiments, the DCD information may include a CMTS name. In some embodiments, the CMTS name may include a unique identifier, a network address, or another suitable CMTS name. In some embodiments, the DCD information may include a DOCSIS service group identifier. In some embodiments, the DCD information may include RF plant information. In some embodiments, the processor may send a query or request (e.g., an Inform request) to a microservices server (e.g., the microservices server 110). In some embodiments, in response to the query or request, the processor may receive from the microservices server a message including RegionID information. In some embodiments, in response to the query or request, the processor may receive from the microservices server a message including HubID information.

In block 806, the processor may determine a software stack authorization for the STB. In some embodiments, the processor may send a query or request to the microservices server for the software stack authorization for the STB. In some embodiments, in response to the query sent to the microservices server, the processor may receive the software stack authorization for the STB from the microservices server.

In block 808, the processor may select a software stack for the STB based on the region information and the software stack authorization for the STB.

In block 810, the processor may obtain the selected software stack to enable the STB to replace existing software with the selected software stack.

Figure 9:
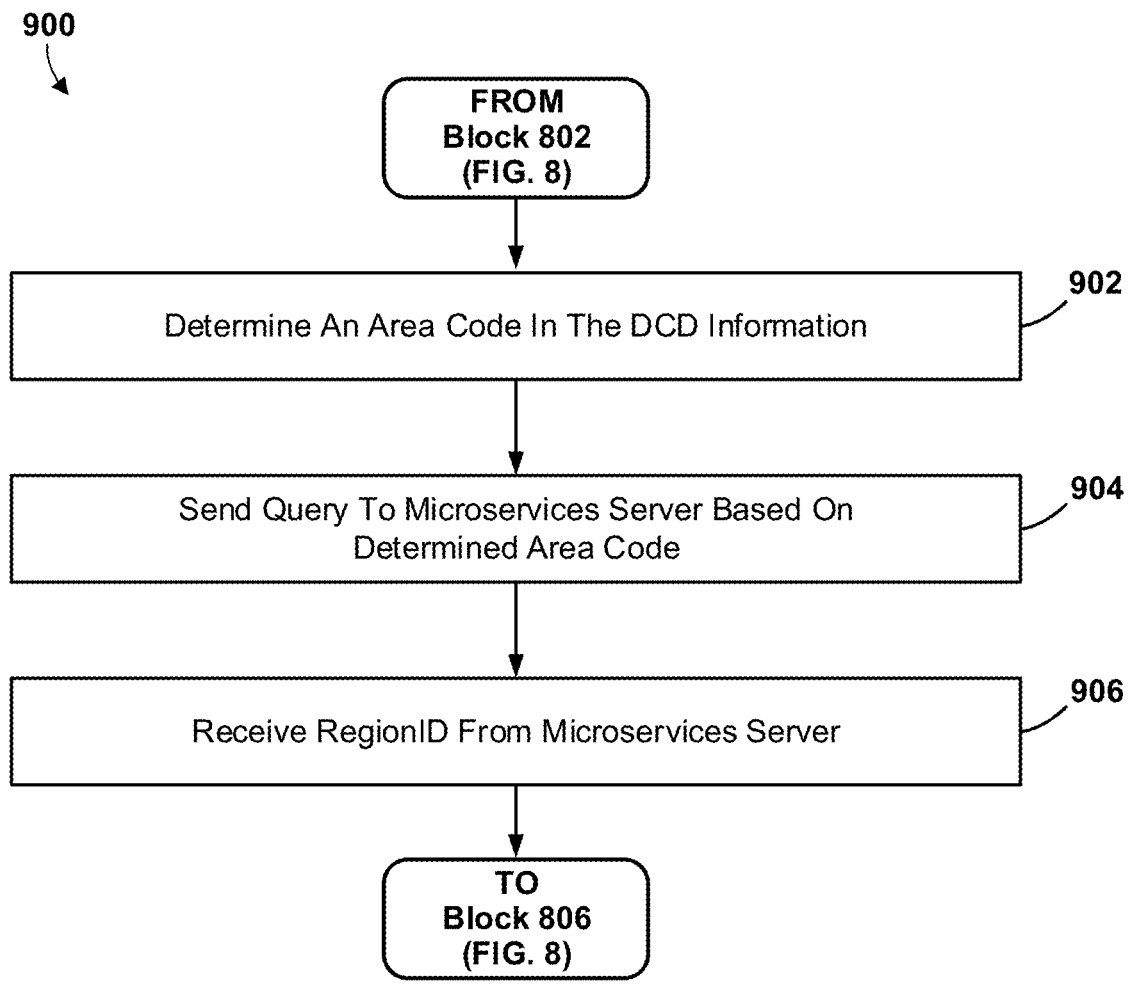
FIG. 9 is a process flow diagram illustrating a method of provisioning a STB with a software stack according to various embodiments.

FIG. 9 is a process flow diagram illustrating operations of a method 900 that may be performed as part of a method of provisioning a STB with a software stack according to various embodiments. With reference to FIGS. 1-9, the method 900 may be implemented in hardware components and/or software components of a computing device (e.g., the software stack server 108) the operation of which may be controlled by one or more processors (e.g., the processor 201 and/or the like).

Following the operations of block 802 (FIG. 8), the processor may determine an area code in the DCD information in block 902. In some embodiments, determining the area code in the DCD information may include determining the area code based on a CMTS name.

In block 904, the processor may send a query to a microservices server (e.g., 110) for a RegionID based on the determined area code.

In block 906, the processor may receive from the microservices server 110 the RegionID.

The processor may proceed to perform the operations of block 806 (FIG. 8).

Figure 10:
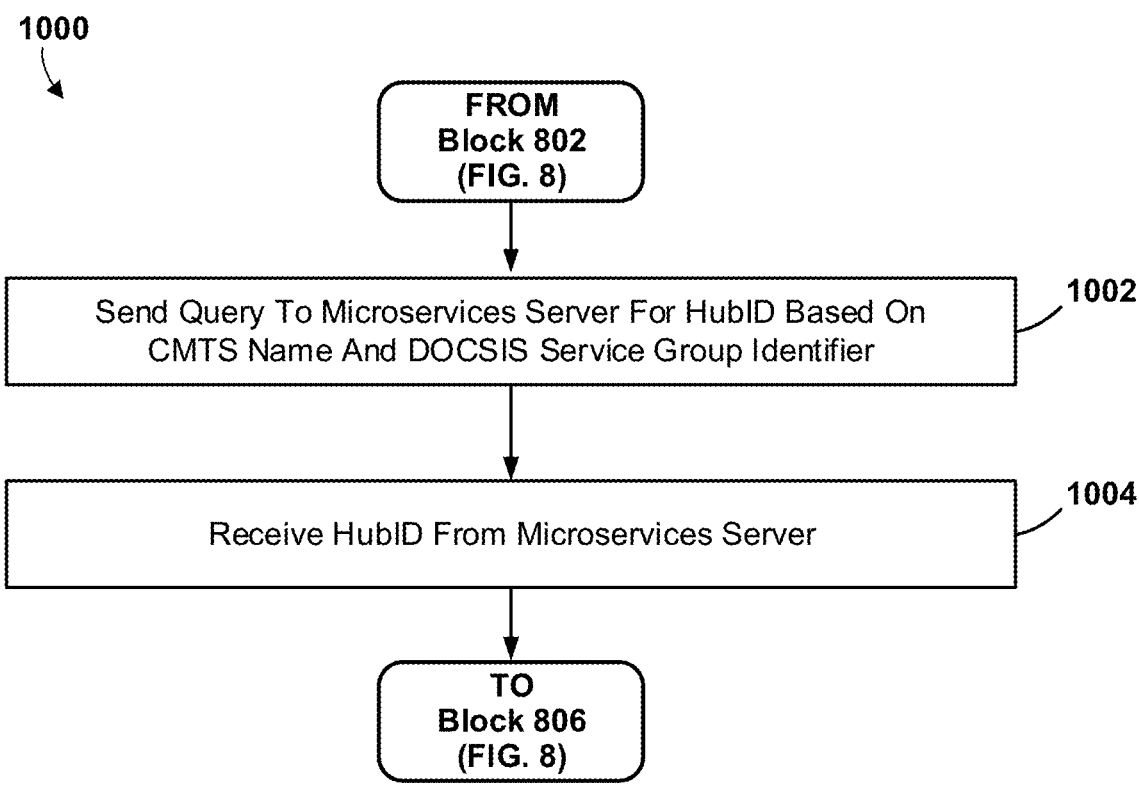
FIG. 10 is a process flow diagram illustrating a method of provisioning a STB with a software stack according to various embodiments.

FIG. 10 is a process flow diagram illustrating operations of a method 1000 that may be performed as part of a method of provisioning a STB with a software stack according to various embodiments. With reference to FIGS. 1-10, the method 1000 may be implemented in hardware components and/or software components of a computing device (e.g., the software stack server 108) the operation of which may be controlled by one or more processors (e.g., the processor 201 and/or the like).

Following the operations of block 802 (FIG. 8), the processor may send a query to a microservices server 110 for a HubID in block 1002. In some embodiments, the query to the microservices server 110 comprises a CMTS name and a DOCSIS service group identifier.

In block 1004, the processor may receive from the microservices server the HubID.

The processor may proceed to perform the operations of block 806 (FIG. 8).

Figure 11:
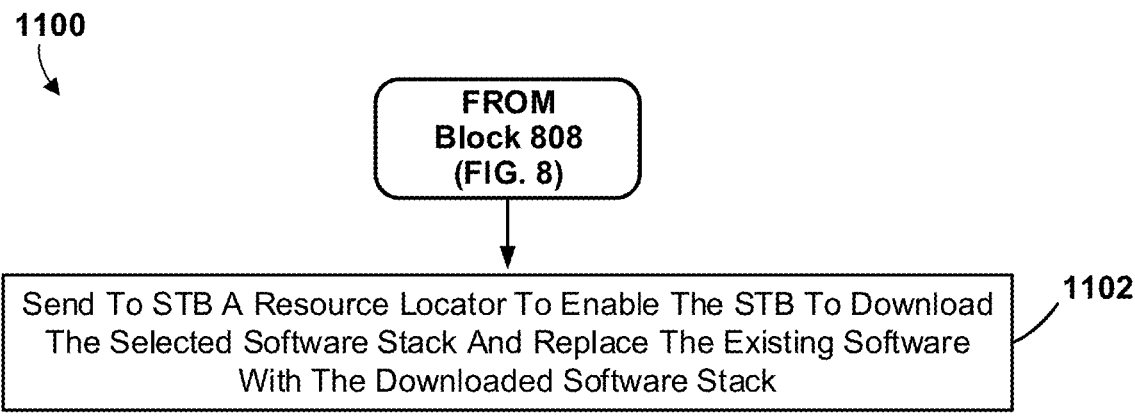
FIG. 11 is a process flow diagram illustrating a method of provisioning a STB with a software stack according to various embodiments.

FIG. 11 is a process flow diagram illustrating operations of a method 1100 that may be performed as part of a method of provisioning a STB with a software stack according to various embodiments. With reference to FIGS. 1-11, the method 1100 may be implemented in hardware components and/or software components of a computing device (e.g., the software stack server 108) the operation of which may be controlled by one or more processors (e.g., the processor 201 and/or the like).

Following the operations of block 808 (FIG. 8), the processor may send to the STB a resource locator to enable the STB to download the selected software stack and replace the existing software with the downloaded software stack. In some embodiments, sending the resource locator to the STB may enable the STB to obtain the software stack from a CDN server (e.g., the CDN server 112).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations, or operations of the methods 700, 800, 900, 1000, and 1100 may be substituted for or combined with one or more operations of the operation/methods 700, 800, 900, 1000, and 1100, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a network element of provisioning a set top box (STB) with a software stack, comprising:
    receiving a software stack download request comprising downstream channel descriptor (DCD) information;
    determining region information for the STB based on the DCD information;
    determining a software stack authorization for the STB;
    selecting a software stack for the STB based on the region information and the software stack authorization for the STB; and
    obtaining the selected software stack to enable the STB to replace existing software with the selected software stack.

2. The method of claim 1, wherein the DCD information comprises a cable modem termination system (CMTS) name.

3. The method of claim 1, wherein the DCD information comprises a Data Over Cable Service Interface Specification (DOCSIS) service group identifier.

4. The method of claim 1, wherein the DCD information comprises radio-frequency (RF) plant information.

5. The method of claim 1, wherein determining the region information for the STB based on the DCD information comprises:
    determining an area code in the DCD information;
    sending a query to a microservices server for a region identifier (RegionID) based on the determined area code; and
    receiving from the microservices server the RegionID.

6. The method of claim 5, wherein determining the area code in the DCD information comprises determining the area code based on a cable modem termination system (CMTS) name.

7. The method of claim 1, wherein determining the region information for the STB based on the DCD information comprises:
    sending a query to a microservices server for a hub identification (HubID); and
    receiving from the microservices server the HubID.

8. The method of claim 7, wherein the query to the microservices server comprises a cable modem termination system (CMTS) name and a Data Over Cable Service Interface Specification (DOCSIS) service group identifier.

9. The method of claim 1, further comprising determining a software stack of the STB,
wherein selecting the software stack for the STB based on the region information and the software stack authorization for the STB further comprises selecting the software stack for the STB based on the determined software stack.

10. The method of claim 1, wherein obtaining the selected software stack to enable the STB to replace the existing software with the selected software stack comprises sending to the STB a resource locator to enable the STB to download the selected software stack and replace the existing software with the downloaded software stack.

11. A network element, comprising:
a communication interface;
a memory; and
a processor coupled to the communication interface and the memory and configured with processor-executable instructions to perform operations comprising:
receiving a software stack download request comprising downstream channel descriptor (DCD) information;
determining region information for a set-top box (STB) based on the DCD information;
determining a software stack authorization for the STB;
selecting a software stack for the STB based on the region information and the software stack authorization for the STB; and
obtaining the selected software stack to enable the STB to replace existing software with the selected software stack.

12. The network element of claim 11, wherein the processor is configured with processor-executable instructions to perform operations such that the DCD information comprises a cable modem termination system (CMTS) name.

13. The network element of claim 11, wherein the processor is configured with processor-executable instructions to perform operations such that the DCD information comprises a Data Over Cable Service Interface Specification (DOCSIS) service group identifier.

14. The network element of claim 11, wherein the processor is configured with processor-executable instructions to perform operations such that the DCD information comprises radio-frequency (RF) plant information.

15. The network element of claim 11, wherein the processor is configured with processor-executable instructions to perform operations such that determining the region information for the STB based on the DCD information comprises:
determining an area code in the DCD information;
sending a query to a microservices server for a region identifier (RegionID) based on the determined area code; and
receiving from the microservices server the RegionID.

16. The network element of claim 15, wherein the processor is configured with processor-executable instructions to perform operations such that determining the area code in the DCD information comprises determining the area code based on a cable modem termination system (CMTS) name.

17. The network element of claim 11, wherein the processor is configured with processor-executable instructions to perform operations such that determining the region information for the STB based on the DCD information comprises:
sending a query to a microservices server for a hub identification (HubID); and
receiving from the microservices server the HubID.

18. The network element of claim 17, wherein the processor is configured with processor-executable instructions to perform operations such that the query to the microservices server comprises a cable modem termination system (CMTS) name and a Data Over Cable Service Interface Specification (DOCSIS) service group identifier.

19. The network element of claim 11, wherein the processor is configured with processor-executable instructions to perform operations further comprising determining a software stack of the STB,
wherein selecting the software stack for the STB based on the region information and the software stack authorization for the STB further comprises selecting the software stack for the STB based on the determined software stack.

20. The network element of claim 11, wherein the processor is configured with processor-executable instructions to perform operations such that obtaining the selected software stack to enable the STB to replace the existing software with the selected software stack comprises sending to the STB a resource locator to enable the STB to download the selected software stack and replace the existing software with the downloaded software stack.

21. A non-transitory processor-readable storage medium having stored thereon processor-executable software instructions configured to cause a processor of a network element to perform operations comprising:
receiving a software stack download request comprising downstream channel descriptor (DCD) information;
determining region information for a set-top box (STB) based on the DCD information;
determining a software stack authorization for the STB;
selecting a software stack for the STB based on the region information and the software stack authorization for the STB; and
obtaining the selected software stack to enable the STB to replace existing software with the selected software stack.

22. The non-transitory processor-readable storage medium of claim 21, wherein the stored processor-executable software instructions are configured to cause the processor to perform operations such that the DCD information comprises a cable modem termination system (CMTS) name.

23. The non-transitory processor-readable storage medium of claim 21, wherein the stored processor-executable software instructions are configured to cause the processor to perform operations such that the DCD information comprises a Data Over Cable Service Interface Specification (DOCSIS) service group identifier.

24. The non-transitory processor-readable storage medium of claim 21, wherein the stored processor-executable software instructions are configured to cause the processor to perform operations such that the DCD information comprises radio-frequency (RF) plant information.

25. The non-transitory processor-readable storage medium of claim 21, wherein the stored processor-executable software instructions are configured to cause the processor to perform operations such that determining the region information for the STB based on the DCD information comprises:
determining an area code in the DCD information;
sending a query to a microservices server for a region identifier (RegionID) based on the determined area code; and
receiving from the microservices server the RegionID.

26. The non-transitory processor-readable storage medium of claim 25, wherein the stored processor-executable software instructions are configured to cause the processor to perform operations such that determining the area code in the DCD information comprises determining the area code based on a cable modem termination system (CMTS) name.

27. The non-transitory processor-readable storage medium of claim 21, wherein the stored processor-executable software instructions are configured to cause the processor to perform operations such that determining the region information for the STB based on the DCD information comprises:
   sending a query to a microservices server for a hub identification (HubID); and
   receiving from the microservices server the HubID.

28. The non-transitory processor-readable storage medium of claim 27, wherein the stored processor-executable software instructions are configured to cause the processor to perform operations such that the query to the microservices server comprises a cable modem termination system (CMTS) name and a Data Over Cable Service Interface Specification (DOCSIS) service group identifier.

29. The non-transitory processor-readable storage medium of claim 21, wherein the stored processor-executable software instructions are configured to cause the processor to perform operations further comprising determining a software stack of the STB,
   wherein selecting the software stack for the STB based on the region information and the software stack authorization for the STB further comprises selecting the software stack for the STB based on the determined software stack.

30. The non-transitory processor-readable storage medium of claim 21, wherein the stored processor-executable software instructions are configured to cause the processor to perform operations such that obtaining the selected software stack to enable the STB to replace the existing software with the selected software stack comprises sending to the STB a resource locator to enable the STB to download the selected software stack and replace the existing software with the downloaded software stack.

\* \* \* \* \*